Nov. 28, 1967          R. D. CONDON ETAL                    3,354,714
                         MARINE SPEEDOMETER
Filed Dec. 1, 1964                                    2 Sheets-Sheet 1
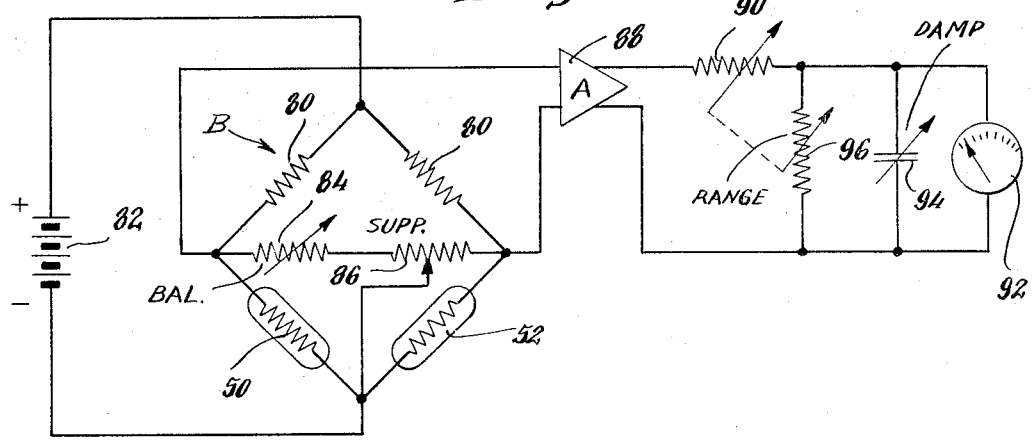
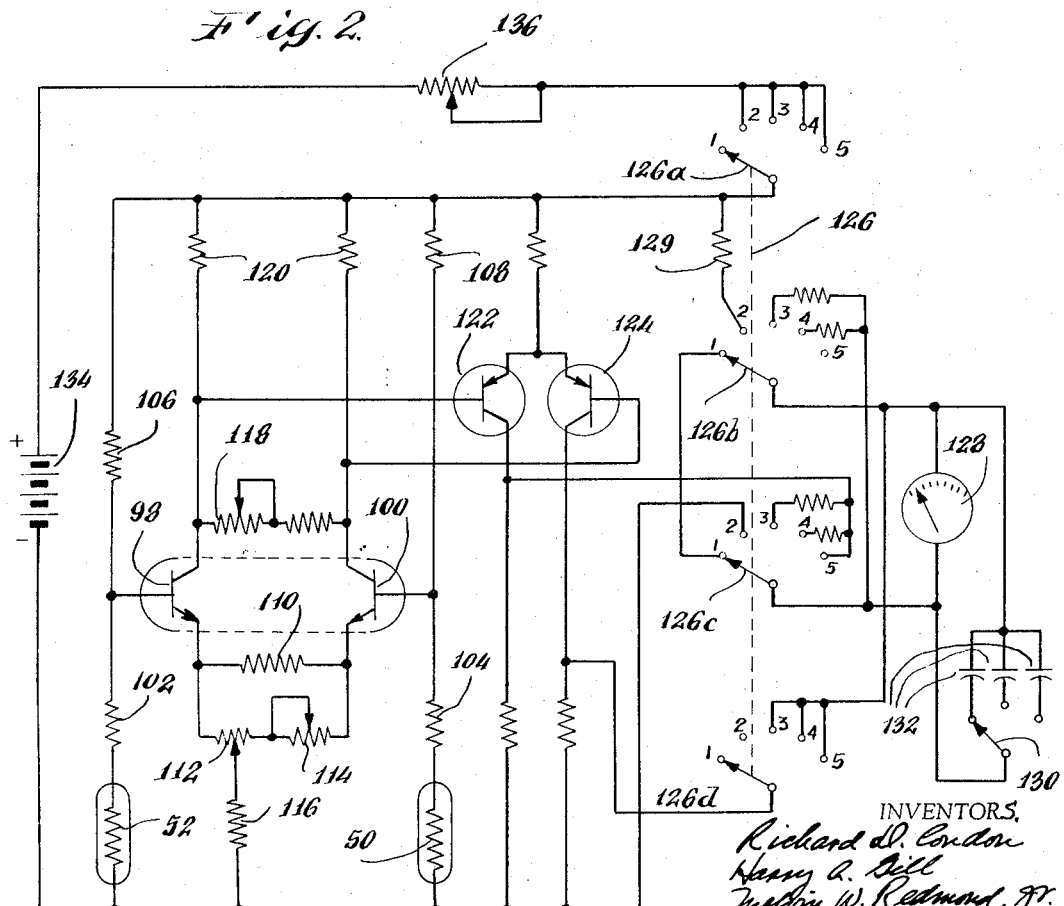
INVENTORS.
Richard D. Condon
Harry A. Dill
Melvin W. Redmond, Jr.
Wooster, Davis & Cifelli
ATTORNEYS.

Nov. 28, 1967  R. D. CONDON ETAL  3,354,714
MARINE SPEEDOMETER
Filed Dec. 1, 1964  2 Sheets-Sheet 2
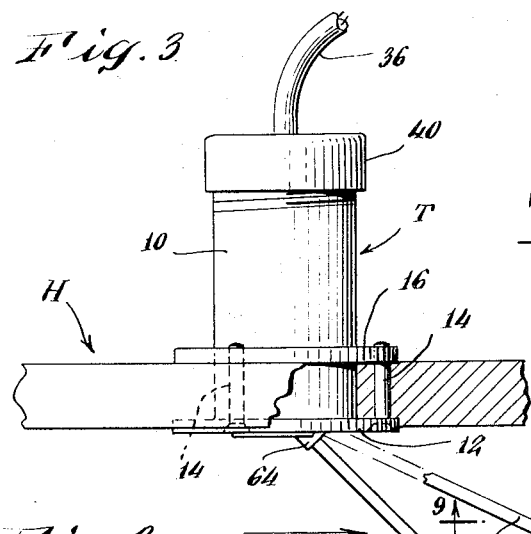
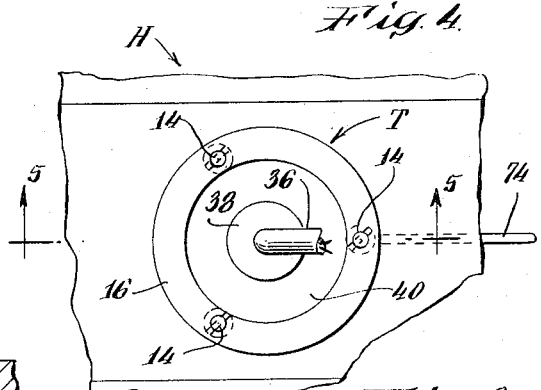
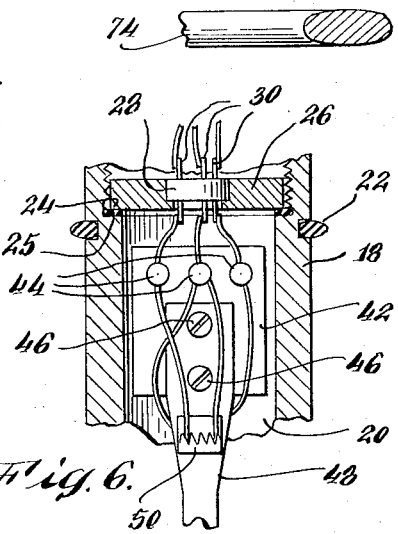
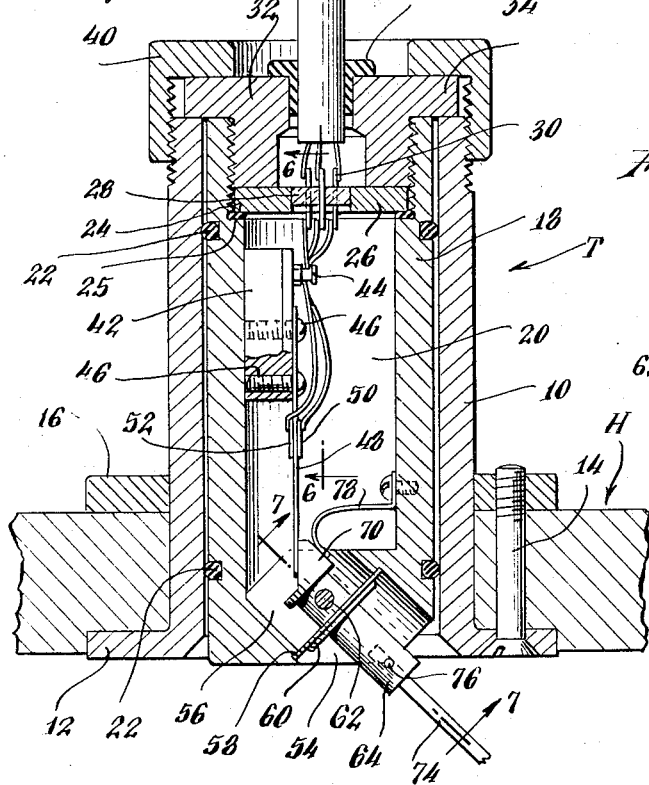
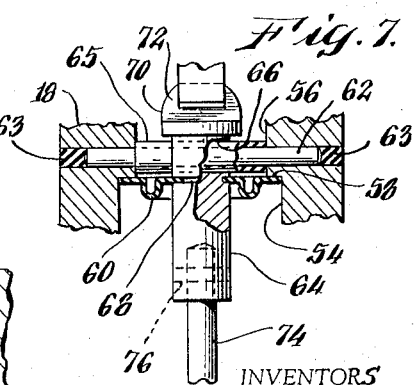
INVENTORS.
Richard D. Condon
Harry A. Gill
Melvin W. Redmond, Jr.
Wooster, Davis & Cifelli
ATTORNEYS.

United States Patent Office 3,354,714
Patented Nov. 28, 1967

3,354,714
MARINE SPEEDOMETER
Richard D. Condon and Harry A. Gill, Ridgefield, and Melvin W. Redmond, Jr., West Redding, Conn., assignors to Raytheon Company, Lexington, Mass., a corporation of Delaware
Filed Dec. 1, 1964, Ser. No. 414,952
16 Claims. (Cl. 73—186)

This invention relates to a marine speedometer and, more particularly, to such a speedometer which is capable of measuring extremely small speed changes.

It would often be desirable to indicate changes in the speed of a boat with extreme sensitivity. This is particularly true in the racing of sailboats. Under these conditions, the exact speed of the boat is of relatively little consequence. What is important, however, is the ability to obtain the maximum possible speed on a given heading. Heretofore, the trimming of sails and the adjustment of the heading have required extreme skill and precise judgment in order to obtain the maximum possible speed and distance. It has been nearly impossible to determine the exact effect of such a change on the speed of the boat. This is because a change in the trim of the sail or a slight change in bearing might affect the actual speed by only a small fraction of a knot. Although this might be sufficient to affect the outcome of a race, it is practically impossible to determine by the senses and no prior art instruments have been capable of indicating such a fine gradation in speed. Although various attempts have been made to provide suitably sensitive marine speedometers, these attempts have proved unsuccessful until the present invention.

Various reasons for the lack of success of prior art speedometers may be pointed out. One resides in the very nature of a speedometer dial. A dial, for example, which is calibrated to indicate actual speed from zero to some predetermined maximum, such as ten knots, would obviously be incapable of clearly indicating speed changes on the order of a fraction of a knot. Even if the instrument were basically able to indicate such changes, it would be practically impossible to read without making the dial unacceptably large. Furthermore, the nature of many prior art speedometers requires the use of a non-linear scale. This may result in the graduations at the lower end of the dial being crowded together so that small speed differences are difficult to detect. Another reason for the lack of success of prior art attempts resides in the fact that the normal action of wind, waves, and currents create short term fluctuations in speed which may be proportional in magnitude to the speed changes which are to be measured. Many prior art speedometers have been designed to operate electronically. These speedometers are subject to power requirement problems which adversely affect battery life. Even when power requirements are reduced, these speedometers lack the required sensitivity.

Other problems are inherent in the prior art transducers employed to measure the velocity of water past the hull. These transducers lack the required sensitivity, are subject to fouling by seaweed and other foreign substances, and are difficult to remove for repair.

Accordingly, it is a primary object of the present invention to provide an improved marine speedometer. Other objects are to provide such a speedometer which is capable of indicating either absolute speed or relative speed; which is capable of indicating relative speed changes with a high degree of sensitivity regardless of boat speed; which will read extremely small speed changes regardless of normal speed fluctuations; which has a linear scale with easy readability without being large in size; which is less subject to fouling; which is easily removable for repair; and which has low power requirements. Other objects, features, and advantages will be apparent from the following description, the appended claims and the figures of the attached drawing wherein:

FIG. 1 is a simplified schematic diagram of a speedometer circuit in accordance with the present invention;

FIG. 2 is a detailed schematic diagram of another speedometer circuit in accordance with this invention;

FIG. 3 is a side view of the transducer assembly of this invention shown mounted in a boat hull;

FIG. 4 is a top view of the assembly of FIG. 3;

FIG. 5 is an enlarged cross section taken along the line 5—5 of FIG. 4;

FIG. 6 is a cross section taken along the line 6—6 of FIG. 5;

FIG. 7 is an enlarged cross section taken along the line 7—7 of FIG. 5;

FIG. 8 is an enlarged cross section taken along line 8—8 of FIG. 3; and

FIG. 9 is an enlarged cross section taken along line 9—9 of FIG. 3.

The objects of this invention are achieved by means of a novel transducer assembly and electronic speed measuring circuit employing zero suppression (scale expansion) and damping, described in more detail hereinafter.

In order to generate the signals required by the circuitry of this invention, there is provided a transducer assembly for generating electrical signals in accordance with the velocity of a boat through the water. One form of an assembly useful in this invention is illustrated in FIGS. 3–7. In FIG. 3 the transducer assembly T is illustrated as mounted in the hull H of a boat. The normal direction of water flow while the boat is underway is indicated by the arrow. As illustrated in FIGS. 3, 4 and 5, the transducer assembly comprises a cylindrical outer housing 10 including an outwardly extending annular flange 12 at its lower end. The housing 10 is mounted within a suitable opening formed in the hull of the boat, the flange 12 being positioned against the outer surface of the hull which is slightly recessed to receive the flange and thereby reduce water friction. The housing, as well as the other metal parts of the assembly, may be constructed of brass or other suitable non-corrosive material. The housing 10 is secured to the hull H by means of bolts 14 which extend through the hull and are threaded into an annular retaining ring 16 mounted on the inner side of the hull encircling the housing 10.

Mounted within the housing 10 is a cylindrical inner body 18 defining a generally cylindrical chamber 20. The outer diameter of the inner body 18 is slightly less than the inner diameter of the housing 10 and is grooved to receive and retain a pair of O rings 22 in sealing relationship between the body 18 and the housing 10. The upper end of inner body 18 has an internal diameter greater than that of chamber 20 so as to define a shoulder 24 upon which rests a sealing gasket 25. This upper end of body 18 is internally threaded. A metal washer 26 rests on gasket 25 and its central opening is closed by a glass disc feed-through 28 having three conductive pins 30 extending therethrough. The washer 26 is retained in position against the gasket 25 by means of a threaded plug 32 which screws into the upper threaded portion of the body 18 against the washer 26. Plug 32 includes an outwardly extending annular flange 34 which rests against the upper end of outer housing 10. A central opening in plug 32 receives the end of a three conductor cable 36 whose conductors are secured to the upper ends of pins 30. A suitable molded strain relief member 38 grips the end of the cable 36 and positions it in the opening of plug 32. An annular outer cap 40 screws onto the threaded outer surface of the upper end of housing 10 and defines a central opening which surrounds the cable 36.

Mounted within the chamber 20 of body 18 is a support block 42. Support block 42 includes a curved vertical rear surface which fits against the inner wall of the body 18 and a flat vertical inner support surface. The upper portion of the flat inner surface of support block 42 carries three spaced terminals 44. Also mounted against the flat inner surface of support block 42 by means of screws 46 is the upper end of a uniform cantilever beam 48 which extends downwardly into the lower portion of the chamber 20. Mounted below the support block 42 and on the rear surface (relative to the boat) of the cantilever beam 48 is a tension strain gauge 50 having leads connected to the two left hand terminals 44 as shown in FIG. 6. Mounted on the front surface of the cantilever beam 48 directly opposite the tension strain gauge 50 is a compression strain gauge 52 having leads which are connected to the right hand terminals 44 as seen in FIG. 6. Both strain gauges are of the resistive bonded type.

The lower end of inner body 18 is drilled at approximately 45° from the vertical to define an angled outer opening 54 and a smaller inner opening 56 communicating with the chamber 20 and concentric with the outer opening to thereby define an annular shoulder 58. Cemented against the shoulder 58 is the outer rim of an annular elastomer sealing diaphragm 60. A pivot pin 62 is mounted in pivot openings in the body 18 and extends across the inner opening 56 above the diaphragm 60 as shown in FIG. 7. The pivot openings are sealed with a suitable sealant such as epoxy resin 63. A cylindrical pivot block 64, which includes a transverse opening 66 into which there is force-fitted a nylon bearing sleeve 65, is rotatably mounted on pin 62. Pivot block 64 includes an annular groove 68 in its outer surface which receives the inner edge of the diaphragm 60. The upper end of the pivot block 64 includes an enlarged head portion 70 having a flat bearing face 72 which contacts the lower end of the cantilever beam 48. An elongated cylindrical strut 74 is mounted at one end in a suitable recess in the end of pivot block 64 and is retained therein by means of a pin 76 passing through both members. The strut 74 extends downwardly into the water at an angle of approximately 45 degrees as illustrated in FIG. 3. A leaf spring 78 is mounted on the inner surface of the body 18 and bears against the side of the head portion 70 with sufficient force to just counteract the weight of the strut 74. Chamber 20 may be filled with a suitable fluid, such as silicone oil, to promote lubrication and mechanical damping. In order to remove the unit for repairs or replacement, the outer cap 40 is removed and plug 32 along with inner body 18 and strut 74 is withdrawn. A solid cap is then screwed into place on outer housing 10.

It will now be seen that, when the boat is at rest, the various parts of the transducer assembly T are positioned as shown in FIGS. 3–7. As the boat begins to move through the water, the force of the water acting in the direction of the arrow as shown in FIG. 3 exerts a force against strut 74 which causes the pivot block 64 to rotate about the pivot pin 62 in a counterclockwise direction as seen in FIG. 5. Bearing face 72 of head portion 70 is already bearing against the lower end of the cantilever beam 48 by virtue of spring 78. Accordingly, no mechanical lag occurs and the counterclockwise rotation of the head portion 70 immediately begins to force the lower end of the beam 48 forward relative to the boat, causing the beam to bend. During the initial movement of the strut 74, its motion is aided by a continuing but decreasing force applied by spring 78. This serves to linearize the curve of true speed vs. indicated speed in the 0 to 1 knot region. Strain gauge 52 thereupon goes into compression and strain gauge 50 goes into tension, thus changing their electrical resistances by equal but opposite amounts. The circuit which utilizes these resistance changes to indicate the speed of the boat will now be described.

In FIG. 1 there is illustrated in simplified form one circuit for achieving the objects of this invention. This circuit utilizes a bridge B which is formed from the strain gauges, 50, 52 and a pair of fixed resistors 80. The input to the bridge is supplied by a battery 82. Across the output of the bridge there is connected a variable balancing resistor 84 and a zero suppression potentiometer 86 which has its movable tap connected to the common connection between strain gauges 50 and 52. The output from the bridge B passes to an amplifier 88. The output from the amplifier 88 is supplied through a variable resistor 90 to an indicating meter 92. Connected across the meter 92 are a variable damping capacitor 94 and a variable range adjusting resistor 96. The range adjusting resistor 96 and the variable resistor 90 are ganged together for common adjustment to provide a constant output impedance for amplifier 88.

The operation of the circuit of FIG. 1 will be best understood by first assuming that the boat is at rest. Under this condition, the balancing potentiometer 84 is adjusted until the output of the bridge is zero and the meter 92 so reads. In order to read absolute speed, the zero suppression potentiometer 86 has been adjusted until the movable tap is at one of its extreme ends, effectively at the electrical center of the bridge. As the boat thereafter moves forward through the water, the strain gauges 50, 52 are flexed in opposite directions so that the bridge B has an output which becomes increasingly positive on one side with respect to the other. This differential output is amplified by the amplifier 88 and indicated by meter 92 which may be calibrated to read directly in knots. The resistors 90, 96 may also be calibrated so that they may be set to adjust the maximum reading of meter 92 to correspond to any pre-selected output from the amplifier 88. Thus, these resistors establish the range of the meter. In order to compensate for short term speed changes (or "noise") the damping capacitor 94 may be adjusted to average out the speed over a period of time until the meter 92 maintains a relatively steady indication.

In order to use the circuit of FIG. 1 to indicate small speed changes, the potentiometers 90, 96 are adjusted to permit the maximum current flow from the amplifier 88 through the meter 92. The zero suppression potentiometer 86 is then adjusted until the meter 92 reads approximately half scale. This expands the meter scale so that extremely small speed changes will then be indicated by observable deflections of the needle of the meter 92.

In the simple schematic diagram of FIG. 1 it will be noted that two separate power supplies are required. These include the battery 82 for supplying the bridge and a second power supply (not shown) for supplying amplifier 88. This would be a disadvantage in many boats, particularly in sailboats not having their own power supply as two batteries would be required. Furthermore, it is desirable to make the power consumption as low as possible in order to reduce the battery drain. Also, if a transistor amplifier is utilized, it would be desirable to protect the transistors from inadvertent reversal of the power supply to the amplifier. These various objectives are achieved in the circuit diagram illustrated in FIG. 2. In this circuit a unique arrangement is provided wherein the sensing elements are incorporated directly into the base circuit of the first stage of the differential amplifier. By means of this arrangement, only one battery is required. In the circuit of FIG. 2 a two stage differential amplifier is employed. The first stage comprises n-p-n transistors 98, 100 having their bases connected directly across a measuring network. The network comprises the two strain gauges 50, 52 and the fixed resistors 102, 104, 106 and 108. The emitters of transistors 98 and 100 are connected to the ends of a fixed resistor 110 and to a series combination of a zero suppression potentiometer 112 and a balancing potentiometer 114. The movable tap of the zero suppression potentiometer 112 is connected through fixed resistor 116 to the junction between strain gauges 50, 52. A calibrating potentiometer 118 is connected between the collectors of the transistors 98 and 100. Resistors 120 are collector load resistors of transistors 98 and 100.

The second stage of the differential amplifier comprises the p-n-p transistors 122, 124. A four pole five position switch 126 is connected into the circuit as illustrated. The four movable switch poles are indicated by the subscripts a–d, respectively and the five terminals of each pole by the numerals 1–5. The switch, as illustrated, is in position 1. Those portions of the switch including poles 126b and 126c together form a range selector switch. The ranges may be, for example, 10 knots (position 3), 5 knots (position 4), and 1 knot (position 5). One side of the differential output from the second transistor stage is supplied to terminals 3, 4 and 5 associated with pole 126c. The other side is connected to the moving pole 126d. A speed indicating meter 128 is connected between the moving poles 126b, 126c and is in parallel with a single pole three position damping control selector switch 130 for connection to any of the damping capacitors 132. Power is supplied both to the bridge and the amplifier by means of a battery 134 connected through a voltage adjustment potentiometer 136 to terminals 2–5 associated with pole 126a.

In describing the operation of the circuit of FIG. 2, it will be assumed that the strain gauges 50, 52 are mounted in an assembly similar to that of FIGS. 3–7. Thus, as the velocity of the water relative to the boat varies, the gauges are stressed by equal but opposite amounts so that their resistances vary accordingly. In other words, the resistance of one strain gauge increases while that of the other decreases. By reference to FIG. 2, it will be seen that the resistors 102, 106 and strain gauge 52 form a divider supplying the base voltage of transistor 98 while the resistors 104, 108 and strain gauge 50 form a divider supplying the base voltage of transistor 100. The base voltages of the transistors 98, 100 are, accordingly, shifted by equal but opposite amounts, providing a differential amplified output to the second stage amplifier 122, 124. Assuming that the five position switch 126 is in its third position, it will be apparent that the meter 128 is in parallel with the resistor connected to terminal 3 of pole 126b and in series with the resistor connected to terminal 3 of pole 126c. These resistors establish the value of the output required for full scale deflection of meter 128. It is also assumed that the tap of potentiometer 112 is full right, thus introducing no zero suppression. Damping of meter fluctuations is provided by that one of the capacitors 132 to which the switch 130 is connected. Thereafter, any variations in relative water velocity will be reflected in the resistances of strain gauges 50, 52 which will cause the indication of meter 128 to vary accordingly.

For maximum sensitivity in the reading of relative speed, the switch 126 is set to position 5—the low range position. The tap of the zero suppression potentiometer 112 is then moved to the left to introduce the desired amount of zero suppression. The effect of such an adjustment is to cause the meter to respond to speed changes with maximum sensitivity but at the same time shift its 0 reading upward to some threshold speed. For example, the meter may be caused to deflect full scale by a 1 knot speed change. The zero suppression, however, may prevent the needle from leaving 0 until 7 knots (for example) is reached. The meter would then read only from 7 to 8 knots over its full scale.

The operation of the circuit of FIG. 2 may be further understood by considering an operating sequence including initial calibration and actual operation.

For the initial calibration, the selector switch 126 is moved from its "off" position at terminal 1 to its "battery check" position on terminal 2. It will then be noted that the meter 128 is connected in series with the current limiting resistor 129 and both are in parallel with the amplifier and measuring network resistors directly across the series combination of battery 134 and amplifier voltage adjustment potentiometer 136. Adjustment potentiometer 136 is then adjusted until the meter 128 reads full scale. This adjusts the amplifier voltage to a reproducible voltage. The selector switch 126 is then moved to position 3, which is the 10 knot range position, and the instrument is allowed to warm up for the necessary period of time. The balancing potentiometer 114 is then adjusted so that the meter reads zero when the boat is not in motion. A course is then run over a measured mile and the calibration control potentiometer 118 is adjusted to give the correct speed reading. Once this initial calibration has been completed, the instrument is ready for operation and, thereafter, only periodic checks of the calibration are required.

When it is desired to check relative speed with high sensitivity such as, for example, when trimming sails or changing heading, the damping control switch 130 is adjusted to a position such that meter fluctuations are cancelled. The sail trim or heading change may then be made and the meter observed. Small variations in the reading of meter 128 indicate an increase or decrease in speed as the result of the adjustments made. The meter is then repositioned to approximately 50% of the full scale deflection by means of the zero suppression potentiometer 112 and the procedure is repeated until maximum speed is obtained. In an actual instrument constructed in accordance with the invention, the meter 128 had 50 scale divisions easily readable to one half division. Actual and reproducible readings of speed variations amounting to .01 knot were obtained.

The nautical speedometer of this invention has been actually used in sailboat racing competion of the highest order and has fully proved its value in obtaining maximum possible speeds. The speedometer has extremely high sensitivity over its entire speed range. By the introduction of zero suppression, the maximum sensitivity of the meter may be utilized regardless of the speed of the boat. By means of the damping control, the speed of the boat is actually averaged over a preselected short period of time. Under relatively constant conditions, little or no damping may be required. However, under changing conditions this averaging feature is important, particularly when using the maximum sensitivity of the speedometer.

The actual values of the electrical elements used in this invention may, of course, be varied in accordance with established design criteria. However, in one actual embodiment of this invention the following values of certain of the elements were employed. The battery 134 was a 12 volt battery. Each of the strain gauges 50, 52 was of the resistive bonded type and had a rated value of 350 ohms. Resistors 102, 104 were rated at 800 ohms. These elements form base divider circuits with resistors 106, 108 and, in this embodiment, resistors 106, 108 were each rated at 1300 ohms. The zero suppression potentiometer 112 was rated at 15 ohms, as was the balancing potentiometer 114. Resistor 116 was a 2200 ohm resistor and resistors 120 were each rated at 4000 ohms. The transistors 98, 100 were combined into one 12A8 dual transistor and each of transistors 122, 124 was a 2N3250. The meter 128 was rated at 100 micro-amperes full scale.

It will be apparent to those skilled in the art, that a number of advantages are achieved by means of this invention which have not been hitherto available in marine speedometers. In addition to obtaining the objects previously set forth, it will be noted that the concept of employing a pair of strain gauges in combination with a difference amplifier substantially reduces any difficulty arising out of variables common to both gauges, such as temperature. The strain gauges are in close proximity with one another and the circuit is essentially balanced.

Accordingly, many errors are avoided which would otherwise require frequent calibration. It will also be noted that the strut 74 in the transducer assembly of FIGS. 3–7 extends rearwardly at an angle of approximately 45 degrees. This helps to prevent fouling by seaweed and other foreign objects and also has certain other advantages. In order to read out velocity linearly it is necessary to correct for the squared term in the equation:

$$\text{Drag Force} = \rho (\text{Drag Coeff.}) \left(\frac{\text{Vel.}^2}{2}\right) (\text{Area})$$

The strain gauges are essentially linear devices and it is desirable to employ a linear amplifier. Accordingly, in the preferred embodiment of the present invention the cantilever beam 48 is made relatively "soft" to accentuate the angular movement of strut 74. The projected area of the strut which is presented to the oncoming water is then reduced as the velocity increases, thereby partially correcting for the squared term. The remaining correction is accomplished as the drag coefficient reduces due to the change in the ratio of the major axis to the minor axis of the elliptical projected area of the strut. This change is illustrated in the cross sections of FIGS. 8 and 9.

It will also be apparent to those skilled in the art that a number of variations and modifications may be made in this invention without departing from its spirit and scope. For example, the principles of this invention may be adapted to the measurement of fluid flow apart from the measurement of speed of vessels. Accordingly, the foregoing description is to be construed as illustrative only, rather than limiting. This invention is limited only by the scope of the following claims.

What we claim as new and desire to secure by Letters Patent of the United States is:

1. An instrument for indicating the velocity of fluid flow which comprises:
   at least one electrical circuit element having a selectively variable electrical parameter responsive to the motion of a body of fluid;
   an electrical circuit having an output signal responsive to variations of said parameter and including first and second variable impedances, first and second substantially fixed electrical impedances, a first end of each fixed impedance being connectable to one side of a power supply means, a first end of each variable impedance being connectable to the other side of said power supply means, a first junction formed from the connection of the second ends of said first fixed impedance and said first variable impedance and a second junction formed from the connection of the second ends of said second fixed impedance and said second variable impedance;
   calibration means for adjusting said output signal to a value substantially proportional to absolute fluid velocity;
   means connected in series across the first and second junctions for selectively suppressing a portion of said output signal without affecting the adjustment of said calibration means;
   indicating means connected to receive said output signal to indicate changes in said parameter as a function of said velocity; and
   transducer means responsive to the force exerted by a moving body of fluid and connected to vary said parameter, said transducer means responsive to the velocity of a fluid to simultaneously vary the impedances of said first and second variable impedances.

2. The instrument of claim 1 wherein said circuit element is a strain gauge.

3. The instrument of claim 2 wherein said transducer means comprises a cantilever beam and wherein said strain gauge is secured to said beam.

4. The instrument of claim 3 wherein said transducer means further comprises pivotable strut means extending into the fluid to be measured and operable to bend said beam.

5. The instrument of claim 1 wherein said indicating means comprises an amplifier responsive to the output of said circuit and an electrical meter responsive to the output of said amplifier.

6. The instrument of claim 1 wherein said transducer means comprises a cantilever beam bendable in response to fluid flow and wherein said variable impedances are strain gauges mounted on opposite sides of said beam.

7. The instrument of claim 1 wherein said indicating means comprises an electrical meter and said circuit includes fluctuation damping means.

8. The instrument of claim 1 wherein said indicating means includes a differential amplifier connected across said first and second junctions.

9. The instrument of claim 1 wherein said calibration means includes means for selectively varying the sensitivity of said electrical circuit means.

10. An instrument for measuring the velocity of fluid flow which comprises: power supply means; a first variable impedance; a second variable impedance; first and second substantially fixed impedances, a first end of each fixed impedance being connected to one side of said power supply means; a first end of each variable impedance being connected to the other side of said power supply means; a first junction formed from the connection of the second ends of said first fixed impedance and said first variable impedance; a second junction formed from the connection of the second ends of said second fixed impedance and said second variable impedance; a first transistor having its base connected to said first junction, its collector connected to said one side of said power supply, and its emitter connected to said other side of said power supply; and a second transistor having its base connected to said second junction, its collector connected to said one side of said power supply, and its emitter connected to said other side of said power supply, said first and second transistors forming a differential amplifier; indicating means connected to the output of said amplifier; and transducer means responsive to the velocity of a fluid to simultaneously vary the impedances of said first and second variable impedances by substantially equal but opposite amounts.

11. The instrument of claim 10 wherein a zero suppression potentiometer is connected between the emitters of said first and second transistors, the movable tap of said potentiometer being connected to the other side of said power supply means.

12. An instrument for measuring the velocity of fluid flow which comprises: a substantially cylindrical hollow vertical housing; a removable hollow body positioned within said housing defining a lower opening; strut means pivotally mounted on said hollow body, a first end of said strut means being positioned within said body and a second end extending into the fluid to be measured; flexible diaphragm means encircling said strut and closing said lower opening; cantilever beam means mounted within said hollow body, the free end of said beam means being in contact with the first end of said strut for flexure of said beam means by movement of said strut; electrical circuit means including first and second variable impedance means mounted on oppositely flexing sides of said beam means; power supply means connected to supply an input potential to said circuit; amplifier means connected to receive and amplify an output potential from said circuit; and indicating means connected to the output of said amplifier means.

13. The instrument of claim 12 wherein said variable impedance means are strain gauges.

14. The instrument of claim 12 wherein spring means is mounted within said hollow body to retain said first end of said strut means in contact with said beam means.

15. A fluid flow transducer which comprises a substantially cylindrical hollow vertical housing; a removable hollow body positioned within said housing defining a lower opening; strut means pivotally mounted on said hollow body, a first end of said strut means being positioned within said body and a second end extending into the fluid to be measured; flexible diaphragm means encircling said strut and closing said lower opening; cantilever beam means mounted within said hollow body, the free end of said beam means being in contact with the first end of said strut for flexure of said beam by movement of said strut; and strain gauges mounted on oppositely flexing sides of said beam.

16. The transducer of claim 15 wherein said hollow body is a cylinder having an upper open first end and an internally extending annular shoulder spaced from said first end and a lower second end defining said lower opening; plug means mounted in said upper end and including a central opening and an outwardly extending flange positioned on the upper edge of said housing; closure disc means mounted between said internally extending shoulder and said plug means and including electrical feed-through conductors, said strain gauges being connected to one end of said feed-through conductors; electrical cable means passing through the central opening of said plug means and connected to the other ends of said feed-through conductors; and annular outer cap means threadedly mounted on the upper end of said housing in clamping relationship against the outwardly extending flange of said plug means.

References Cited
UNITED STATES PATENTS

| | | | |
|---|---|---|---|
| 2,389,615 | 11/1945 | Eder | 323—75 |
| 2,531,145 | 11/1950 | Marco et al. | 323—75 |
| 2,781,505 | 2/1957 | Grant | 323—75 |
| 2,826,914 | 3/1958 | Reiley | 78—228 |
| 2,974,279 | 3/1961 | Barry et al. | 323—75 |
| 3,115,777 | 12/1963 | Hochreiter | 73—228 |
| 3,147,612 | 9/1964 | Evans | 73—228 |
| 3,147,620 | 9/1964 | Stapler | 73—228 |
| 3,188,421 | 6/1965 | Rowell | 73—228 |
| 3,234,787 | 2/1966 | Ruge | 73—141 |
| 3,238,773 | 3/1966 | Leigh | 73—186 |

LOUIS R. PRINCE, *Primary Examiner.*

NEIL B. SIEGEL, *Assistant Examiner.*